United States Patent [19]

Sato et al.

[11] Patent Number: 5,421,026
[45] Date of Patent: May 30, 1995

[54] DATA PROCESSOR FOR PROCESSING INSTRUCTION AFTER CONDITIONAL BRANCH INSTRUCTION AT HIGH SPEED

[75] Inventors: Yoshikuni Sato; Kouji Maemura, both of Tokyo, Japan

[73] Assignee: NEC Corporation, Tokyo, Japan

[21] Appl. No.: 220,936

[22] Filed: Mar. 31, 1994

Related U.S. Application Data

[63] Continuation of Ser. No. 48,565, Feb. 8, 1993, abandoned, and a continuation of Ser. No. 573,750, Aug. 28, 1990, abandoned.

[30] Foreign Application Priority Data

Aug. 28, 1989 [JP] Japan .................................. 1-222062

[51] Int. Cl.[6] .......................... G06F 9/34; G06F 12/12; G06F 15/78
[52] U.S. Cl. ........................... 395/800; 395/425; 395/375; 364/231.8; 364/240; 364/253; 364/261.5; 364/DIG. 1
[58] Field of Search ................. 395/800, 425, 400, 375

[56] References Cited

U.S. PATENT DOCUMENTS

| | | | |
|---|---|---|---|
| 4,613,935 | 9/1986 | Couleur .................. | 395/375 |
| 4,742,451 | 5/1988 | Bruckert et al. .......... | 395/375 |
| 4,760,520 | 7/1988 | Shintani et al. .......... | 395/375 |
| 4,942,520 | 7/1990 | Langendorf ............. | 395/425 |
| 5,053,954 | 10/1991 | Miyoshi .................. | 395/375 |
| 5,081,574 | 1/1992 | Larson et al. ........... | 395/375 |
| 5,129,068 | 7/1992 | Watanabe et al. ........ | 395/400 |

FOREIGN PATENT DOCUMENTS 0159712 10/1985 European Pat. Off. .
0236745 9/1987 European Pat. Off. .

*Primary Examiner*—Alyssa H. Bowler
*Assistant Examiner*—Alpesh M. Shah
*Attorney, Agent, or Firm*—Sughrue, Mion, Zinn, Macpeak & Seas

[57] ABSTRACT

A data processor includes a first circuit for decoding a sequence of instruction including a conditional branch instruction in such a manner that said conditional branch instruction is decoded and an instruction fetched after said conditional branch instruction is decoded before a branch condition for said conditional branch instruction has not decided. Said first circuit generates an operand address for the decoded instruction and a first signal indicating that said operand address is one generated before a branch condition is decided. A second circuit generates, after decision of said branch condition, a second signal indicating whether or not an instruction decoded after said conditional branch instruction is executed. The bus interface circuit performs replacement of a content of an associative memory. A control circuit receives the first and second signals and operates to hold replacement of a content of the associative memory.

5 Claims, 3 Drawing Sheets

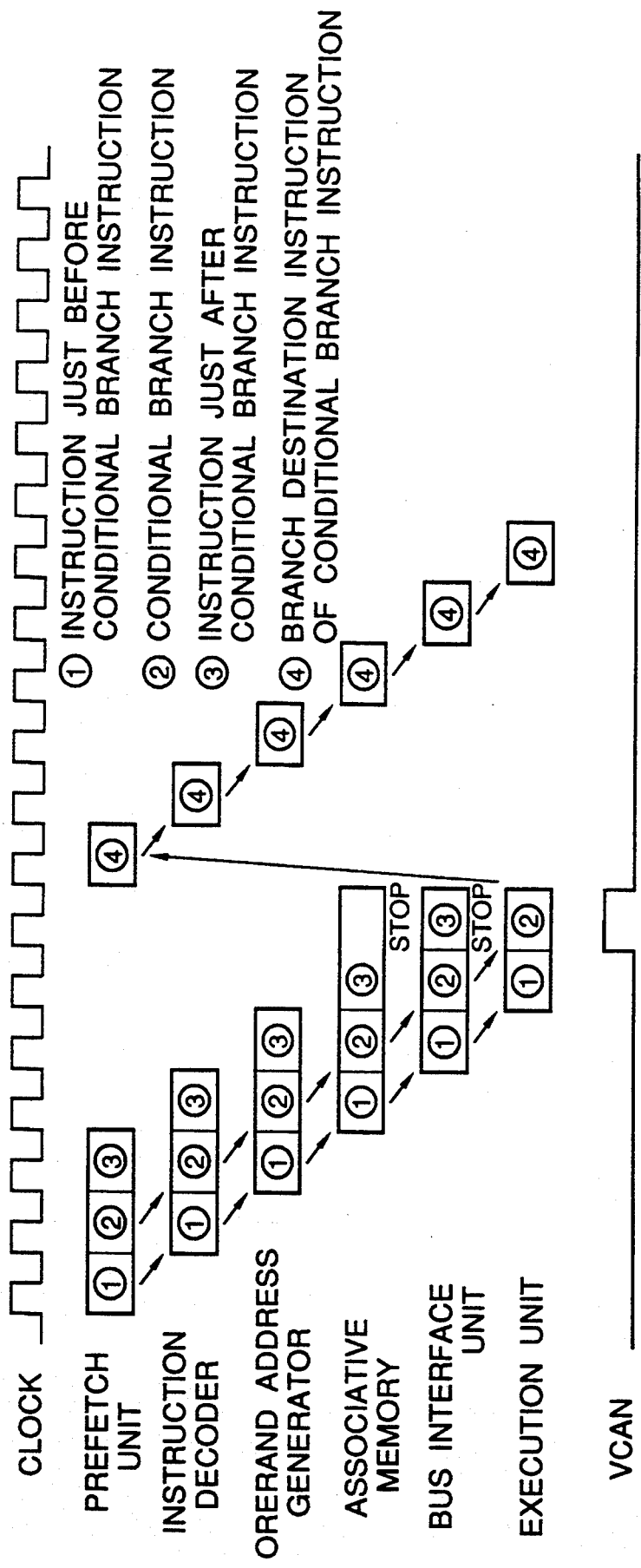

DATA PROCESSOR FOR PROCESSING INSTRUCTION AFTER CONDITIONAL BRANCH INSTRUCTION AT HIGH SPEED

This is a Continuation of application Ser. No. 08/048,565 filed Feb. 8, 1993, now abandoned, which is a Continuation of application Ser. No. 07/573,750 filed Aug. 28, 1990, now abandoned.

BACKGROUND OF THE INVENTION

1. Field of the Invention

The present invention relates to a data processor capable of processing a conditional branch instruction, and more specifically a control circuit used in a central processing unit for processing a conditional branch instruction.

2. Description of Related Art

Recent central processing units have adopted an instruction prefect control for a speed-up of a processing. In addition, a pipelined processing, in which a processing required for executing one instruction is divided into a plurality of processings, which are executed in parallel at one time, has been also adopted so as to rapidly process a given sequence of instructions.

However, advantages of the instruction prefetch and the pipeline processing cannot be often obtained when a conditional branch instruction is executed. The reason for this is as follows: Assume that a conditional branch instruction is prefetched and an branch destination instruction or a next instruction in the case of no branching are prefetched so that a pipeline processing is performed. In this condition, if a branch condition for the conditional branch instruction is determined or decided on the basis of the result of execution of a preceding instruction, it is in some case that the result of the processing becomes invalid after the conditional branch instruction.

More specifically, when a conditional branch instruction is executed, a conditional branch instruction is prefetched in a prefetch unit, and then, a branch destination or an instruction next to be executed in case of no branching is accumulated in the prefetch unit. On the other hand, after an instruction decoder decodes a conditional branch instruction supplied from the prefetch unit, the instruction decoder decodes the instruction next supplied from the prefetch unit. If the next instruction includes a memory operand, the instruction decoder sends an address generation information to an operand address generator. At this time, if execution of a preceding instruction before the conditional branch instruction has not yet been completed and if the condition for branching depends upon an execution result of the preceding instruction, there is possibility that the address supplied from the operand address generator is not executed. The operand address calculated in the operand address generator is finally supplied to and stored in an bus interface circuit as an operand data. Therefore, if the operand address is not executed, an extra data remains in the bus interface circuit. As a result, an erroneous operand is executed by an instruction after the branch instruction.

In order to overcome this problem, it has been proposed that, a first signal indicating that an address to be calculated from now is an address before the branch condition is determined or decided, is generated on the basis of an execution flag of an execution unit, a branch condition information of the conditional branch instruction decoded by the instruction decoder, and an execution timing for the execution unit. The first signal thus generated is supplied together with the operand address to the bus interface circuit. In addition, after the preceding instruction before the conditional branch instruction has been executed, there is generated a second signal indicating that an instruction or instructions decoded after the branch instruction are not executed. The second signal is also supplied to the bus interface circuit.

With this arrangement, when the bus interface circuit receives the second signal, the bus interface circuit can know that the operand address supplied together with the first signal is not executed. However, before the bus interface circuit receives the second signal, the bus interface circuit starts an operation necessary for accessing the operand address. In this case, if the operand address to be accessed is not included in an associated high speed memory such as a content addressable memory or associative memory, a content of the associative memory is replaced with a different content stored in an external main memory. As a result, the branch destination instruction is stopped at the pipelined stage of the bus interface unit and the associative memory until the replacement of content of the associative memory has been completed. However, the replacement itself of content of the associative memory is not necessary, since it is no longer necessary to access the operand address supplied together with the first signal as mentioned above.

The access to the associative memory can be executed at a speed considerably higher than that of accessing to the external main memory. Therefore, when the operand access is invalid, even if the associative memory is accessed, the execution of access to the associative memory will not substantially delay execution of a succeeding instruction. However, when the operand address to be accessed is not included in the associative memory, if a bus cycle for accessing the main memory is started, a substantial time is required because access to the main memory is slow. In general, a block size of the associative memory is larger than a bus width of an external data terminal coupled to the main memory, and therefore, in order to replace the content of the associative memory, several bus cycles are required and an overhead becomes large. As a result, an substantial extra time is consumed because of the operand not to be executed, and therefore, execution of an instruction to be executed next to the conditional branch instruction is substantially delayed.

SUMMARY OF THE INVENTION

Accordingly, it is an object of the present invention to provide a data processor which has overcome the above mentioned defect of the conventional one.

Another object of the present invention is to provide a pipelined data processor capable of executing an instruction to be executed next to a conditional branch instruction even if an operand address accessed before a branch condition is determined or decided is not included in a high speed memory such as an associated memory.

The above and other objects of the present invention are achieved in accordance with the present invention by a data processor comprising means for prefetching a sequence of instructions, means receiving a prefetched instruction sequentially supplied from the instruction prefetching means for decoding the received prefetched instruction, means receiving an instruction execution information from the instruction decoding means for executing the decoded instruction, means receiving an address generation information from the instruction decoding means for generating an operand address for the decoded instruction, associative memory means accessed in accordance with the operand address, means receiving an execution status information from the executing means and a branch condition information from the instruction decoding means for generating a first signal indicating that the operand address is one generated before a branch condition is decided, means receiving the execution status information from the executing means and the branch condition information from the instruction decoding means for generating, after decision of the branch condition, a second signal indicating whether or not an instruction decoded after the conditional branch instruction is executed, and means receiving the first and second signals for holding replacement of a content of the associative memory means.

The above and other objects, features and advantages of the present invention will be apparent from the following description of preferred embodiments of the invention with reference to the accompanying drawings.

BRIEF DESCRIPTION OF THE DRAWINGS

FIG. 3 is a timing chart illustrating an example of the operation of the conditional branch instruction control circuit shown in FIG. 1.

DESCRIPTION OF THE PREFERRED EMBODIMENTS

Figure 1:
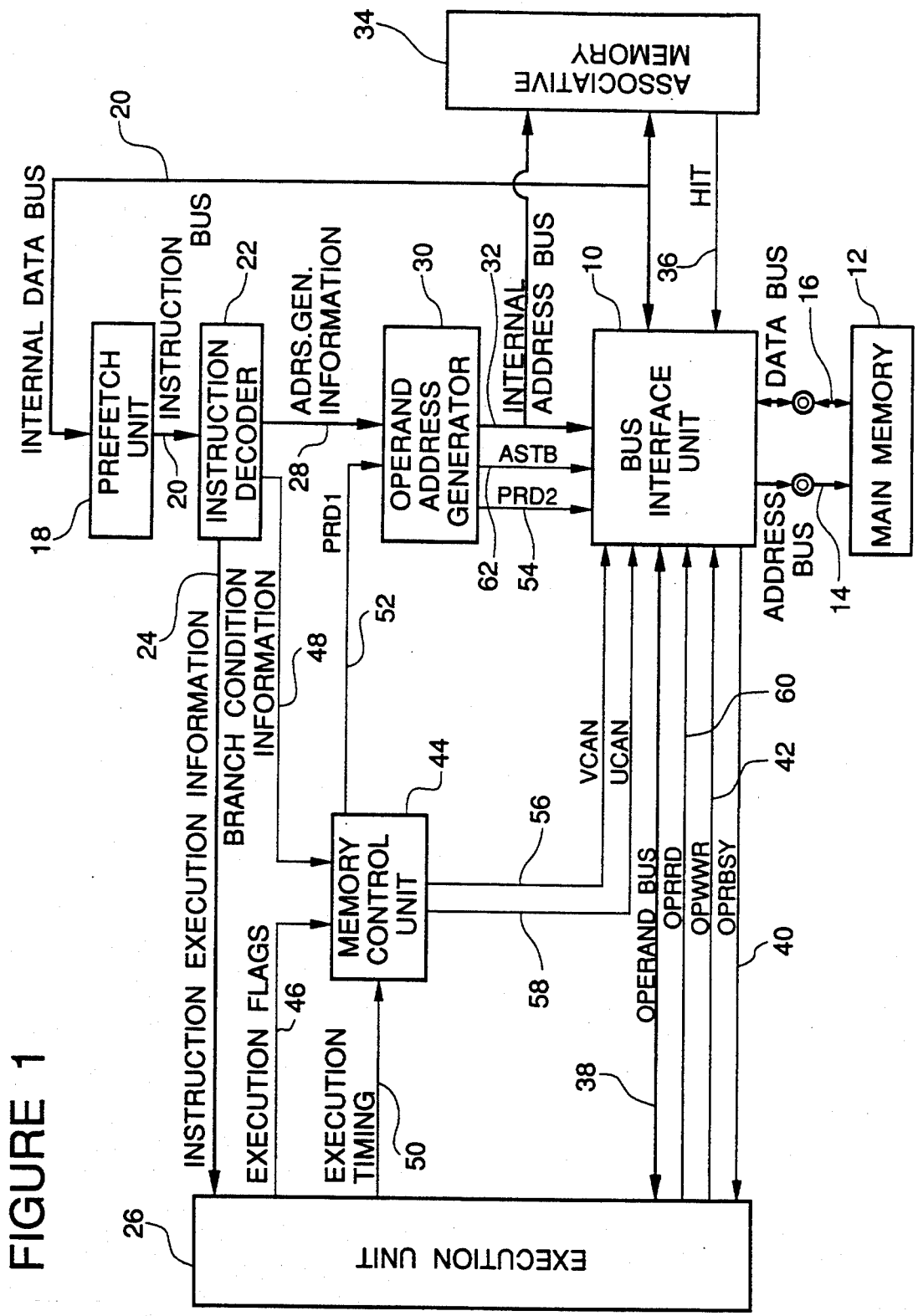
FIG. 1 is a block diagram of one embodiment of the central processing unit including the conditional branch instruction control circuit in accordance with the present invention.

Referring to FIG. 1, there is shown a block diagram of one embodiment of the central processing unit including the conditional branch instruction control circuit in accordance with the present invention.

A bus interface unit 10 for controlling an interface between the central processing unit and an external main memory 12, is coupled to the main memory 12 through an external address bus 14 and an external data bus 16, and operates to start a bus cycle for the main memory so as to send an instruction to a prefetch circuit 18 through an internal data bus 20. The prefetch circuit 18 fetches and accumulates instructions supplied from the bus interface unit 10, and supplies prefetched instructions through an instruction bus 20 to an instruction decoder 22 in a fetched order.

The instruction decoder 22 decodes an instruction supplied from the prefetch unit 18 and outputs an instruction execution information through a bus 24 to an execution unit 26 and an address generation information through bus 28 to an operand address generator 30. On the basis of the address generation information, the operand address generator 30 calculates an operand address and outputs the calculated operand address through an internal address bus 32 together with an address strobe signal ASTB 62 to the bus interface unit 10. The calculated operand address is also supplied to an associative memory 34.

When the address supplied from the operand address generator 30 is one already registered in the associative memory 34, the associative memory 34 outputs to the bus interface unit 10 a content (operand data) corresponding to the address supplied from the operand address generator 30. At the same time, the associative memory 34 activates a hit signal HIT 36 so as to inform the bus interface unit 10 of it.

If the address supplied from the operand address generator 30 corresponds to none already registered in the associative memory 34, the associative memory 34 brings the HIT signal 36 into an inactive condition so as to inform the bus interface unit 10 of it. If the bus interface unit 10 is informed by the inactive HIT signal 36 that the address supplied from the operand address generator 30 corresponds to none already registered in the associative memory 34, the bus interface unit 10 drives the external address bus 14 so as to start a bus cycle for the main memory 12. As a result, the bus interface unit 10 receives data from the main memory 12 through the external data bus, and registers the received data into the associative memory 34. At the same time, the bus interface unit 10 outputs the operand data to the execution unit 26 through an operand bus 38, and also outputs a signal OPRBSY 40 to the execution unit 26.

The execution unit 26 executes the given instruction by outputting an operand read signal OPRRD 60 to the bus interface unit 10 and using the given operand read from the bus interface unit 10, and supplies the result of execution through the operand bus 38 to the bus interface unit 10 so that the result of execution is stored in an internal register or in the external main memory 12. In the case of storing the result of execution into the main memory 12, the execution unit 26 outputs an operand write signal OPWWR 42 to the bus interface unit 10, so that the bus interface 10 starts the bus cycle for writing into the main memory 12 and supplies a write data (the result of execution) to the external data bus 16. With this, execution of one instruction has been completed, and execution of a next instruction is started.

When a conditional branch instruction is executed, the conditional branch instruction and an instruction to be executed next to the conditional branch instruction in the case of no branching are stored in the prefetch circuit 18. The instruction decoder 22 decodes the conditional branch instruction, and thereafter, decodes a succeeding instruction supplied from the prefetch circuit 18 next to the conditional branch instruction. If the succeeding instruction includes an memory operand, the instruction decoders 22 generates the address generation information 28 to the operand address generator 30.

However, as explained hereinbefore, if execution of an preceding instruction just before the conditional branch instruction has not been completed and a branch condition depends upon the result of the execution of the preceding instruction, there is possibility that an address generated by the operand address generator is not finally executed. The operand address calculated in the operand address generator is finally supplied to and stored in the bus interface circuit 10 as an operand data. Therefore, if the operand address is not executed, an extra data remains in the bus interface circuit. As a result, an erroneous operand is executed by an instruction after the branch instruction.

In order to solve this problem, the shown central processing unit includes a memory control unit 44 which compares a execution flag 46 from the execution unit 26 with a branch condition information 48 of the decoded conditional branch information instruction from the instruction decoder 22, and generates, in response to an execution timing signal 50 from the execution unit, a PRD1 signal 52 indicating that an address to be calculated from now is an address before the branch condition is determined or decided. This PRD1 signal 52 is supplied to the operand address generator 30, which outputs the received PRD1 signal 52 as a PRD2 signal 54 to the bus interface unit 10 at the same timing as the operand address is outputted to the bus interface unit 10. After the preceding instruction before the conditional branch instruction has been executed, the memory control unit 44 also generates a VCAN signal 56 indicating that an instruction or instructions decoded after the branch instruction are not executed, and a UCAN signal 58 indicating that an instruction or instructions decoded after the branch instruction are executed. These signals are supplied to the bus interface circuit 10.

Figure 2:
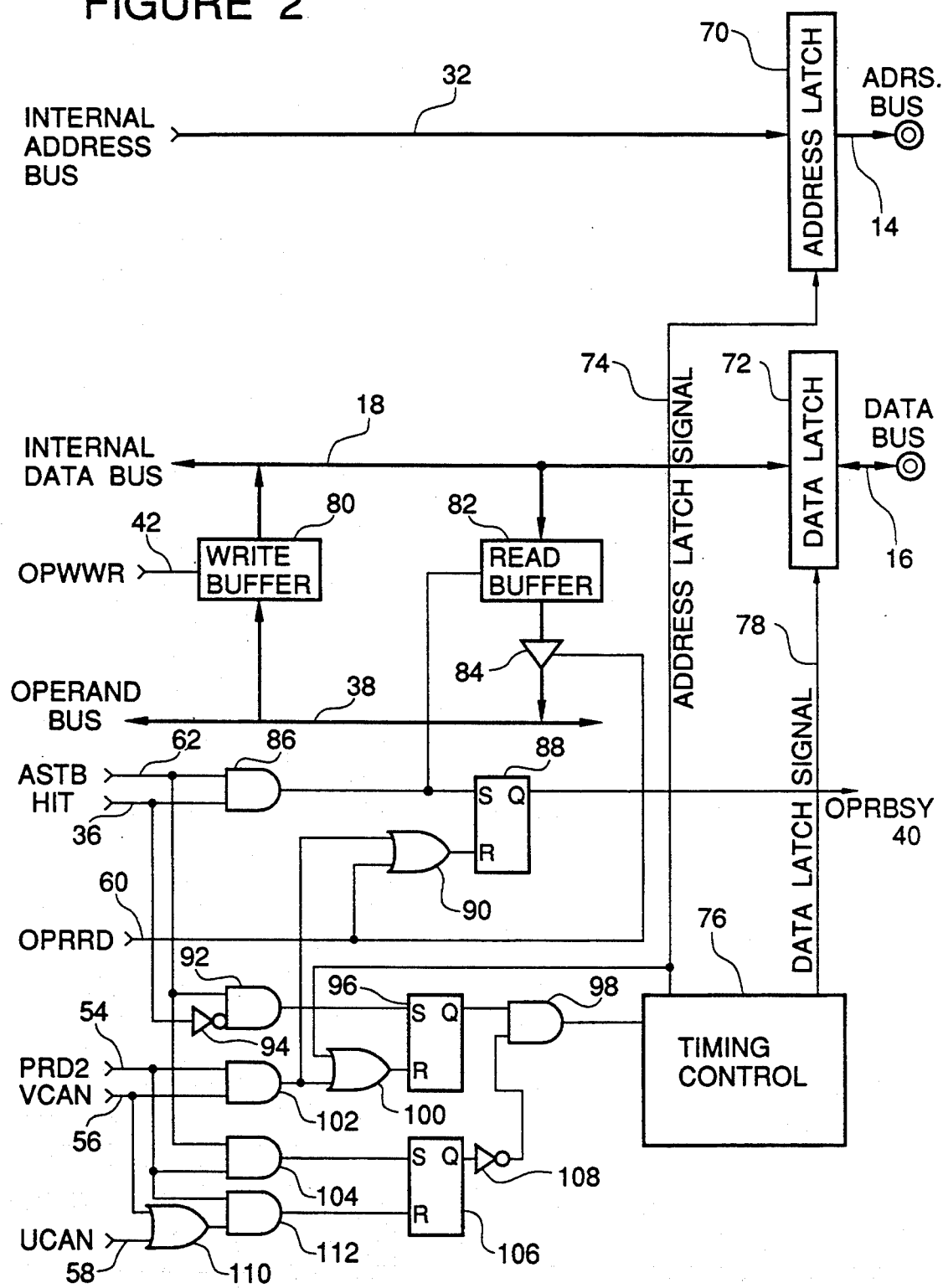
FIG. 2 is a detailed block diagram of the bus interface unit in the conditional branch instruction control circuit shown in FIG. 1.

Referring to FIG. 2, there is shown a detailed block diagram of the bus interface unit 10. The bus interface unit 10 includes an address latch 70 having an input connected to the internal address bus and an output connected to the external address bus 14, and a data latch 72 of a bidirectional type having a first input/output connected to the internal data bus 18 and a second input/output connected to the external data bus 16. The address latch 70 is controlled by an address latch signal 74 generated by a timing control circuit 76, and the data latch 72 is controlled by a data latch signal 78 generated by the timing control circuit 76.

The internal data bus 18 is connected to an output of a write buffer 80, which has an input connected to the operand bus 38 and which is controlled by the OPWWR signal 42, so that when the OPWWR signal 42 is active, the operand is written through the write buffer 80 to the external main memory. Furthermore, the internal data bus 18 is connected to an input of a read buffer 82, which has an output connected to the operand bus 38 through a tristate 84.

The ASTB signal 62 and the HIT signal 36 are supplied to an AND gate 86, whose output is connected to an control input of the read buffer 82 and a set input S of a set/reset flipflop 88. A Q output of the flipflop 88 generates the OPRBSY signal 42. The OPRRD signal 60 is connected to an input of an OR gate 90, which in turn has an output connected to a reset input of the flipflop 88. Also, the OPRRD signal 60 is supplied to an control input of the tristate 84, so that when the OPRRD signal 60 is active and the HIT signal 36 is active, the operand is read from the associative memory 34 through the internal data bus 18 to the operand bus 38.

In addition, the ASTB signal 62 is supplied to one input of an AND gate 92, and the HIT signal 36 is supplied to through an inverter 94 to the other input of the AND gate 92. An output of the AND gate 92 is connected to a set input S of another set/reset flipflop 96. A Q output of the flipflop 96 is connected to one input of an AND gate 98, whose output is connected to the timing control circuit 76 as a bus cycle start signal. The address latch signal 74 is connected to one input of an OR gate 100, whose output is connected to a reset input of the flipflop 96.

The PRD2 signal 54 and the VCAN signal 56 are connected to an AND gate 102, having an output connected to the other input of each of the OR gates 90 and 100. The ASTB signal 62 and the PRD2 signal 54 are connected to an AND gate 104, whose output is connected to a set input of a third set/reset flipflop 106. A Q output of the flipflop 108 gives an access hold signal and is connected through an inverter 108 to the other input of the AND gate 98.

The VCAN signal 56 and the UCAN signal 58 are connected to an OR gate 110, whose output is connected to one input of an AND gate 112. The other input of the AND gate 112 is connected to receive the PRD2 signal 54, and an output of the AND gates 112 is connected to a reset input of the flipflop 106.

In the above mentioned arrangement, a signal influenced when the operand address calculated in the operand address generator 30 is not executes, is the OPRBSY signal 40. Therefore, this OPRBSY signal 40 is initialized by the VCAN signal 56. When the PRD2 signal 54 indicating that an address to be calculated from now is an address before the branch condition is determined or decided is supplied together with the operand address from the operand address generator 30, if there is generated the VCAN signal 56 indicating that an instruction or instructions decoded after the branch instruction are not executed, the AND gate 102 outputs an active signal through the OR gate 90 to the reset input of the flipflop 88 so that the OPRBSY signal 40 is brought into an initialized or low level. In addition, the active signal outputted from the AND gate 102 is supplied through the OR gate 100 to the reset input of the flipflop 96 so that the Q output of the flipflop 96 is brought to a low level. Therefore, the bus cycle start signal is not outputted from the AND gate 98 to the timing control circuit 76. Furthermore, since the PRD2 signal 54 and the VCAN signal 56 are inputted to the AND gate 112, the flipflop 106 is reset, and therefore, a high level signal is inputted to the other input of the AND gate 98 from the inverter 108.

On the other hand, when the ASTB signal 54 is generated from the operand address generator 30, if the HIT signal 36 is activated, the flipflop 88 is set so that the OPRBSY signal 40 is activated. On the other hand, if the HIT signal 36 is not activated, the active OPRBSY signal 40 is not generated, and the AND gate 92 generates an active signal to the set input of the flipflop 96 so that the Q output of the flipflop 96 generates the bus cycle start signal for an external access. However, when the bus cycle start signal is set, if the branch condition has not been decided, namely, the PRD2 signal 54 is active, the flipflop 106 is set so as to generate the access hold signal. Therefore, the bus cycle start signal is blocked by the AND gate 98 so that the bus cycle start is held.

In due course, the branch condition is determined or decided. If the operand address calculated by the operand address generator 30 is to be executed, the UCAN signal 58 is activated, so that the flipflop 106 is reset so as to initialize the bus cycle hold signal, since the PRD2 signal 54 is active. As a result, the bus cycle start signal is outputted from the flipflop 96 through the AND gate 98 to the timing control circuit 76, so that a bus cycle for replacement of the content of the associative memory 34 is started.

On the other hand, if the operand address calculated by the operand address generator 30 is not to be executed, when the VCAN signal 56 is activated. In response to the activated VCAN signal 56, the flipflops 96 and 106 are reset or cleared. Therefore, no access to the associative memory 34 is performed.

Referring to FIG. 3, there is shown a timing chart illustrating an example of execution of a conditional branch instruction. In FIG. 3, ① indicates an execution condition of an instruction which is prefetched just before an conditional branch instruction and which determines a branch condition for the conditional branch instruction. ② indicates an execution condition of an conditional branch instruction itself. ③ indicates an execution condition of an instruction which is prefetched just after an conditional branch instruction and is to be executed after the conditional branch instruction when a branching is not performed. ④ indicates an execution condition of a branch destination instruction to be executed after the conditional branch instruction when a branching is performed.

The timing chart shown in FIG. 3 illustrates a case in which a branch is performed as the result of the conditional branch instruction ② and an operand address for the succeeding instruction ③ is not registered in the associative memory 34. The respective instructions are respectively executed by respective pipelined stages in the order shown by arrows.

As seen from FIG. 3, even if the branch is performed as the result of the conditional branch instruction ② and the operand address for the succeeding instruction ③ is not registered in the associative memory 34, replacement of the content of the associative memory is held or suspended, and therefore, the execution for the branch destination instruction ④ is not stopped by the pipeline stage of the associative memory and the bus interface unit.

In the above mentioned embodiment, it would be understood that the associative memory 34 is a cache memory for storing a copy of the main memory. The present invention can be also applied to a conditional branch instruction control circuit for a memory storing virtual address/physical address pairs in a virtual memory management.

As seen from the above description of the embodiment with reference to the drawings, the conditional branch instruction control circuit in accordance with the present invention is such that, when an address to be accessed to an associative memory before determination of decision of a branch condition for a conditional branch instruction is not actually registered or stored in the associative memory, replacement of a content of the associative memory is held or suspended until determination of decision of the branch condition for the conditional branch instruction. With the feature, an extra access time to a main memory can be removed, and therefore, it is possible to avoid delay of the execution of an instruction after the conditional branch instruction.

The above feature is advantageous over a case in which, until a branch condition for a conditional branch instruction has been determined or decided, processings of upstream stages in the pipelined processing including an instruction decoding and an address calculation are stopped. The reason for this is that if a processing of a downstream stage in the pipelined processing such as replacement of the associative memory is stopped, since the processings of upstream stages in the pipelined processing are not stopped until determination of decision of the branch condition for the conditional branch instruction, it is possible to immediately execute an instruction after the conditional branch instruction when a branch is not actually performed. Therefore, when the operand does not become invalid or when the operand is registered in the associative memory, a high speed processing can be performed.

The invention has thus been shown and described with reference to the specific embodiments. However, it should be noted that the present invention is in no way limited to the details of the illustrated structures but changes and modifications may be made within the scope of the appended claims.

We claim:

1. A data processor comprising:

instruction prefetching means for prefetching a sequence of instructions, including conditional branch instructions, means for receiving a prefetched instruction sequentially supplied from the instruction prefetching means, instruction decoding means for decoding the received prefetched instruction into a decoded instruction, means for receiving instruction execution information from said instruction decoding means, executing means for executing the decoded instruction, means for receiving address generation information from said instruction decoding means, operand address generating means for generating an operand address for the decoded instruction, associative memory means accessed by said operand address generating means in accordance with said operand address, means for receiving execution status information from the executing means and branch condition information derived from the conditional branch instructions from said instruction decoding means, means for generating a first signal indicating that said operand address is one generated before a branch condition is decided, means for receiving the execution status information from the executing means and the branch condition information from said instruction decoding means and for generating, after a decision of said branch condition is made, a second signal indicating whether an instruction decoded after said conditional branch instruction is executed, replacement hold means for receiving said first and second signals and for holding replacement of a content of said associative memory means in accordance with said first and second signals, interfacing memory means for interfacing between the data processor and an external main memory and for replacing the content of said associative memory by accessing said external main memory, wherein said interfacing memory means receives said operand address from said operand address generating means and is controlled by said replacement hold means so that when the replacement of the content of said associative memory means is to be held, said interfacing memory means does not access said external main memory.

2. A data processor as claimed in claim 1 further including:

means for receiving the execution status information and an execution timing information from the executing means and the branch condition information from said instruction decoding means and for generating said first signal indicating that an address to be calculated from now is an address before the branch condition is determined and said second signal indicating that at least one instruction decoded after the conditional branch instruction is not executed, and a third signal indicating that at least one instruction decoded after the branch instruction is executed, the first, second and third signals being supplied to the interfacing memory means.

3. A data processor comprising:

instruction prefetching means for prefetching a sequence of instructions, including conditional branch instructions;

instruction decoding means for receiving a prefetched instruction sequentially supplied from said instruction prefetching means, and for decoding the received prefetched instruction into a decoded instruction;

executing means which receives instruction execution information from said instruction decoding means, for executing the decoded instruction;

operand address generating means which receives address generation information from said instruction decoding means, for generating an operand address for the decoded instruction;

associative memory means accessed by said operand address generating means in accordance with said operand address;

memory control means which receives execution status information from said executing means and branch condition information derived from the conditional branch instructions by said instruction decoding means, said memory control means generating a first signal indicating that said operand address is one generated before a branch condition is decided, said memory control means also generating, after decision of said branch condition is made, a second signal indicating whether or not an instruction decoded after said conditional branch instruction is executed; and bus interface means for interfacing between the data processor and an external main memory and for replacing a content of said associative memory by accessing said main external memory, said bus interface means receiving said operand address from said operand address generating means and being controlled by said first and second signals so that when the replacement of the content of said associative memory means is to be held, said bus interfacing means does not access said external main memory.

4. A data processor claimed in claim 3, wherein said memory control means receives said execution status information and execution timing information from said executing means and said branch condition information from said instruction decoding means and generates a first control signal indicating that an address to be calculated from now is an address before the branch condition is determined, a second control signal indicating that at least one instruction decoded after the conditional branch instruction is not to be executed, and a third control signal indicating that at least one instruction decoded after the conditional branch instruction is to be executed, said first, second and third control signals being supplied to said bus interface means.

5. A data processor claimed in claim 4, wherein said associative memory means generates a hit signal indicative of whether or not said operand address supplied from said operand address generating means is hit in said associative memory means, said hit signal being supplied to said bus interface means, and wherein when said hit signal indicates that said operand address supplied from said operand address generating means is not hit, if said second control signal is active, said bus interface means does not start a bus cycle accessing said external main memory for the replacement of the content of said associative memory means, but if said second control signal is inactive and said third control signal is active, said bus interface means starts the bus cycle accessing said external main memory for the replacement of the content of said associative memory means.

* * * * *